United States Patent
Shimizu et al.

(10) Patent No.: US 9,762,986 B2
(45) Date of Patent: Sep. 12, 2017

(54) FRAME CONVERTER AND FRAME CONVERSION METHOD

(71) Applicant: FUJITSU LIMITED, Kawasaki-shi, Kanagawa (JP)

(72) Inventors: Makoto Shimizu, Oyama (JP); Shota Shinohara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 14/022,985

(22) Filed: Sep. 10, 2013

(65) Prior Publication Data

US 2014/0119733 A1    May 1, 2014

(30) Foreign Application Priority Data

Nov. 1, 2012  (JP) .................... 2012-241794

(51) Int. Cl.
  *H04J 3/16* (2006.01)
  *H04J 3/08* (2006.01)
  *H04Q 11/00* (2006.01)

(52) U.S. Cl.
  CPC ........ *H04Q 11/0067* (2013.01); *H04J 3/1664* (2013.01); *H04J 3/1682* (2013.01); *H04J 3/08* (2013.01); *H04J 2203/0069* (2013.01); *H04Q 2213/13367* (2013.01)

(58) Field of Classification Search
  None
  See application file for complete search history.

(56) References Cited

U.S. PATENT DOCUMENTS 6,108,390 A *   8/2000  Bell et al. ..................... 375/372
7,020,401 B2    3/2006  Sakano et al.
8,638,683 B2 *  1/2014  Honma et al. ................ 370/252
8,854,963 B1 * 10/2014  Muma et al. ................. 370/231
2003/0169755 A1 * 9/2003  Ternovsky .................... 370/412
2004/0156622 A1 * 8/2004  Kent et al. ..................... 386/96

FOREIGN PATENT DOCUMENTS

JP    2001-177886    6/2001
JP    2011-176750    9/2011
JP    2012-4839      1/2012

OTHER PUBLICATIONS

U.S. Appl. No. 13/787,856, filed Mar. 7, 2013, Junichi Sugiyama, Fujitsu Limited.
Office Action dated May 6, 2014 in related U.S. Appl. No. 13/787,856.
Notice of Allowance dated Aug. 15, 2014 in related U.S. Appl. No. 13/787,856.

* cited by examiner

*Primary Examiner* — Ayaz Sheikh
*Assistant Examiner* — Tarell Hampton
(74) *Attorney, Agent, or Firm* — Staas & Halsey LLP (57) ABSTRACT

There is provided a frame converter that writes input data included in an input frame to a buffer to accumulate the input data and outputs data read from the buffer as output data included in an output frame, the frame converter includes a setting unit configured to set a time interval from start of resizing of data rate of the input data to start of resizing of data rate of the output data when resizing of an accumulation amount in the buffer is performed in which data rates of the input data and the output data vary, and an adjustment unit configured to adjust to approximate the data rate of the output data to the data rate of the input data after the time interval has elapsed since the start of resizing of data rate of the input data.

9 Claims, 13 Drawing Sheets

FRAME CONVERTER AND FRAME CONVERSION METHOD

CROSS-REFERENCE TO RELATED APPLICATION

This application is based upon and claims the benefit of priority from the prior Japanese Patent Application No. 2012-241794 filed on Nov. 1, 2012, the entire contents of which are incorporated herein by reference.

FIELD

The embodiment discussed herein is related to a frame converter and a frame conversion method.

BACKGROUND

In a network field, as a next-generation optical transport technology whose application range is expected to expand, Optical Transport Network (OTN), which can handle packet-based data in an integrated manner, is recommended by ITU-T.

In the OTN, it is possible to handle Time Division Multiplexing (TDM)—based data of Synchronous Optical Network (SONET)/Synchronous Digital Hierarchy (SDH) and the like and packet-based data of Ethernet (registered trademark, hereinafter simply referred to as "LAN") and the like in an integrated manner.

In the OTN, there is an Optical Channel Data Unit flex (ODUflex) method that can provide a variable band according to demand in order to efficiently transmit packet-based data, which is current main traffic. Further, there is a Hitless Adjustment of ODU flex resizing (HAO) method that realizes a hitless function which stops data error from occurring during normal operation in order to effectively use an optical transmission layer of a transmission apparatus.

Japanese Laid-open Patent Publication No. 2001-177886 and Japanese Laid-open Patent Publication No. 2012-4839 are examples of related art.

SUMMARY

According to an aspect of the invention, a frame converter that writes input data included in an input frame to a buffer to accumulate the input data and outputs data read from the buffer as output data included in an output frame, the frame converter includes a setting unit configured to set a time interval from start of resizing of data rate of the input data to start of resizing of data rate of the output data when resizing of an accumulation amount in the buffer is performed in which data rates of the input data and the output data vary, and an adjustment unit configured to adjust to approximate the data rate of the output data to the data rate of the input data after the time interval has elapsed since the start of resizing of data rate of the input data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

How far an accumulation amount in a buffer in which resizing is performed is away from the center of the buffer capacity (one-half of the maximum capacity) is monitored when the resizing is performed and an output data rate is corrected according to the monitoring result. Therefore, when a variation of increase and decrease of an input data rate increases, the accumulation amount in the buffer in which the resizing is performed increases or decreases significantly until the output data rate is corrected.

When the variation of increase and decrease of the input data rate increases, a variation of increase and decrease of the output data rate increases. Therefore, every time data passes through a transmission apparatus, the variations of increase and decrease of the data rates increase, so that a capacity of a buffer that absorbs the variations of increase and decrease of the data rates increases. Further, when the capacity of the buffer increases, retention time of data in the buffer, that is, transmission delay of data, increases.

In an embodiment below, a frame converter and a frame conversion method which suppress increase of a buffer capacity will be described with reference to the drawings.

Network System

Figure 1:
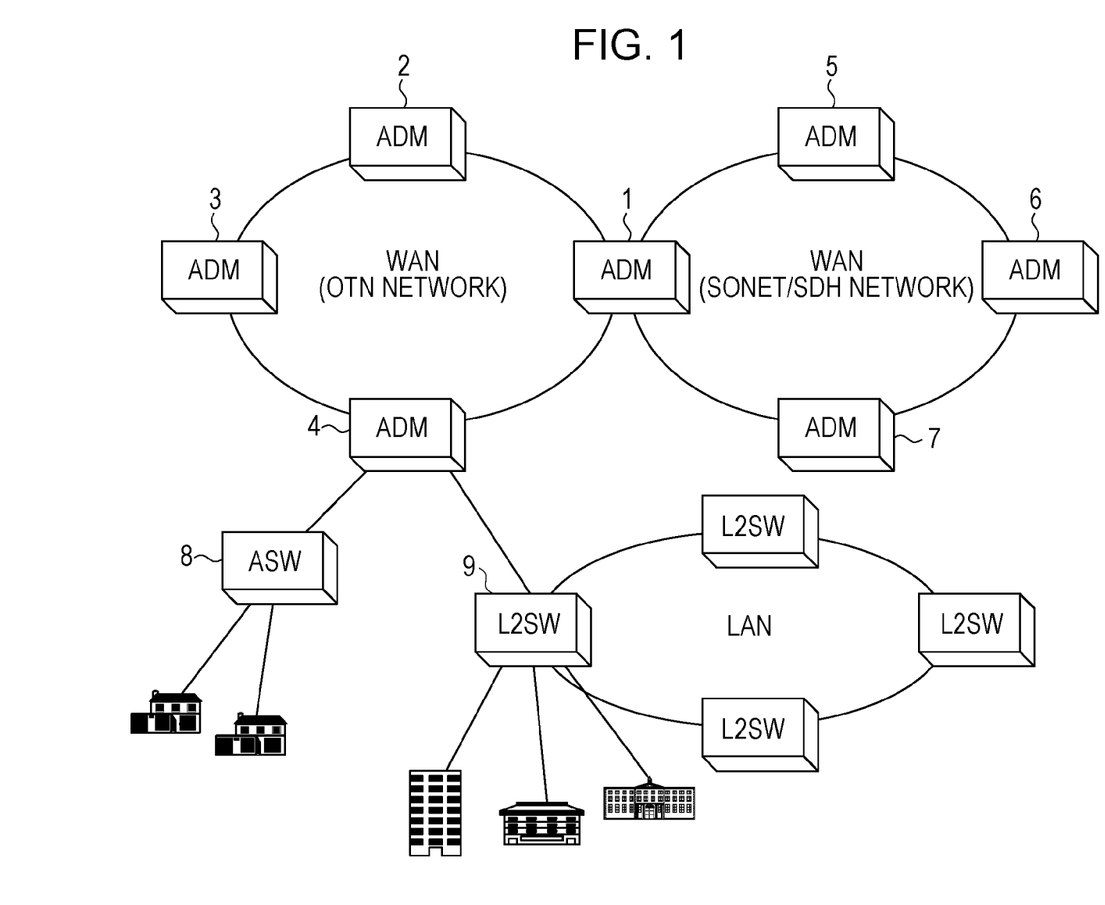
FIG. 1 is a configuration diagram of an example of a network system.

FIG. 1 illustrates a configuration diagram of an example of a network system. In FIG. 1, an Add Drop Multiplexer (ADM) 1 and ADMs 2, 3, and 4 form an OTN network (Wide Area Network: WAN). Further, the ADM 1 and ADMs 5, 6, and 7 form an SONET (or SDH) network. The ADM 4 is connected to an Aggregate SWitch (ASW) 8 and a Layer2 SWitch (L2SW) 9 that forms a Local Area Network (LAN) such as an Ethernet (registered trademark) network.

The ADM1 performs communication in the OTN network by putting a Constant Bit Rate (CBR) signal of the SONET, the SDH, and the like on an OTN frame by a Bit-synchronous Mapping Procedure (BMP) mapping. Further, the ADM 1 demaps the OTN frame into a SONET signal and transmits the SONET signal to the SONET network.

By the way, in the OTN, there is an Optical Channel Data Unit flex (ODUflex) method that can provide a variable band according to demand in order to efficiently transmit packet-based data, which is current main traffic.

Figure 2:
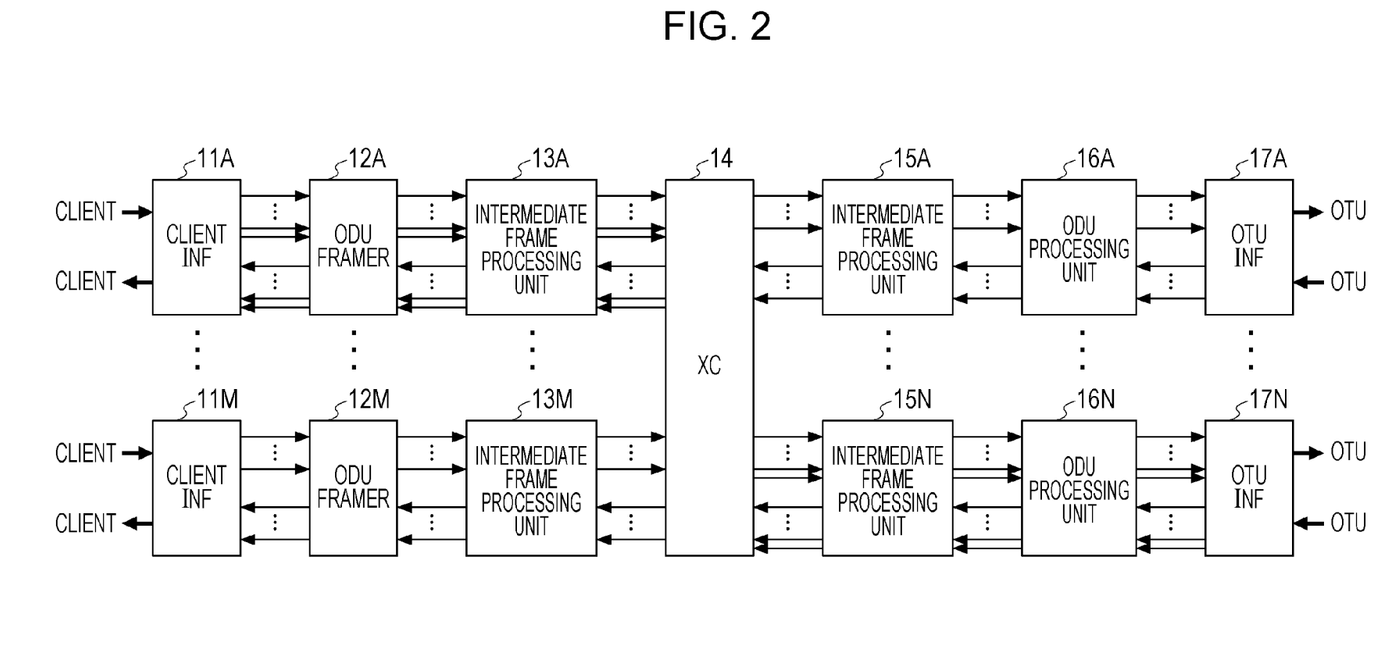
FIG. 2 is a configuration diagram of an example of an ADM of an OTN network.

FIG. 2 illustrates a configuration diagram of an example of an ADM apparatus of the OTN network. In FIG. 2, client interfaces 11A to 11M receive a client signal such as a LAN signal (10 GbE) and a SONET signal from a client. The received client signal is mapped into Lower Order ODU (LO_ODU) or Lower Order ODUflex (LO_ODUflex) by ODU framers 12A to 12M. Further, the mapped signal is converted into an intermediate frame by intermediate frame processing units 13A to 13M. Thereafter, the intermediate frame is supplied to an ODU cross-connect unit 14 and cross-connected. An operation to set or arrange information in a certain area in a frame may be referred to as "mapping".

Further, the intermediate frame processing units 13A to 13M convert the intermediate frame supplied from the ODU cross-connect unit 14 into an LO_ODU frame or a LO_ODUflex frame. The client signal such as the LAN signal and the SONET signal is demapped from the converted LO_ODU frame or the converted LO_ODUflex frame by the ODU framers 12A to 12M. The demapped client signal is transmitted from the client interfaces 11A to 11M to the client. An operation to extract information from a certain area in a frame may be referred to as "demapping".

The intermediate frame cross-connected by the ODU cross-connect unit 14 is supplied to intermediate frame processing units 15A to 15N on the network side and converted into LO_ODU or LO_ODUflex. The LO_ODU frame or the LO_ODUflex frame is supplied to ODU processing units 16A to 16N, multiplexed here, mapped into Higher Order ODU (HO_ODU), further added an overhead and FEC described later, and formed into a Higher Order Optical channel Transport Unit (HO_OTU) frame. The HO_OTU frame is transmitted from the OTU interfaces 17A to 17N to the OTN network. The LO_ODU frame and the LO_ODUflex frame are also referred to as a low-speed signal transmission frame and the HO_ODU frame is also referred to as a high-speed signal transmission frame.

The OTU interfaces 17A to 17N receive the HO_OTU frame from the OTN network and supply the HO_OTU frame to the ODU processing units 16A to 16N. The ODU processing units 16A to 16N demultiplex a LO_ODU frame or a LO_ODUflex frame from the HO_OTU frame and supply the LO_ODU frame or the LO_ODUflex frame to the intermediate frame processing units 15A to 15N. The intermediate frame processing units 15A to 15N convert the LO_ODU frame or the LO_ODUflex frame into an intermediate frame. Thereafter, the intermediate frame is supplied to an ODU cross-connect unit 14 and cross-connected.

Here, multiplex accommodation of the ODUflex frame into HO_ODUk is realized by defining a tributary slot (TS) which is a time slot obtained by dividing an Optical Channel Payload Unit 'k' (OPUk) payload area which is a payload portion of an HO_ODUk frame into the number of tributary slot accommodations (TS) in terms of bytes and accommodating the ODUk into each TS in the payload area of the HO_ODUk frame.

In ITU-T G.709 recommendation, two types of tributary slots, the bands of which are about 1.25 Gbps and about 2.5 Gbps for one TS, are defined. Regarding the number of tributary slot accommodations ts in the case in which the band for one tributary slot is about 1.25 Gbps, it is defined that ts is 2 for HO_ODU1, ts is 8 for HO_ODU2, ts is 32 for HO_ODU3, and ts is 80 for HO_ODU4. The tributary slot is also referred to as a time slot, the number of tributary slot accommodations ts is also referred to as the number of time slot accommodations, and a TS number for identifying the tributary slot is also referred to as a time slot number. The band of the ODUflex is increased or decreased in TS.

A hitless function is realized which stops data error from occurring even when resizing is performed by using a HAO method which enables free resizing in tributary slots (1.25 Gbps). In order to do that, Link Connection Resize (LCR) which increases or decreases a connection bandwidth and Bandwidth Resize (BWR) which increases or decreases an actually used bandwidth in the connection bandwidth are performed. In the BWR, a bandwidth of 64 kbps is increased or decreased with a period of 125 µs.

Example of Frame Converter

Figure 3:
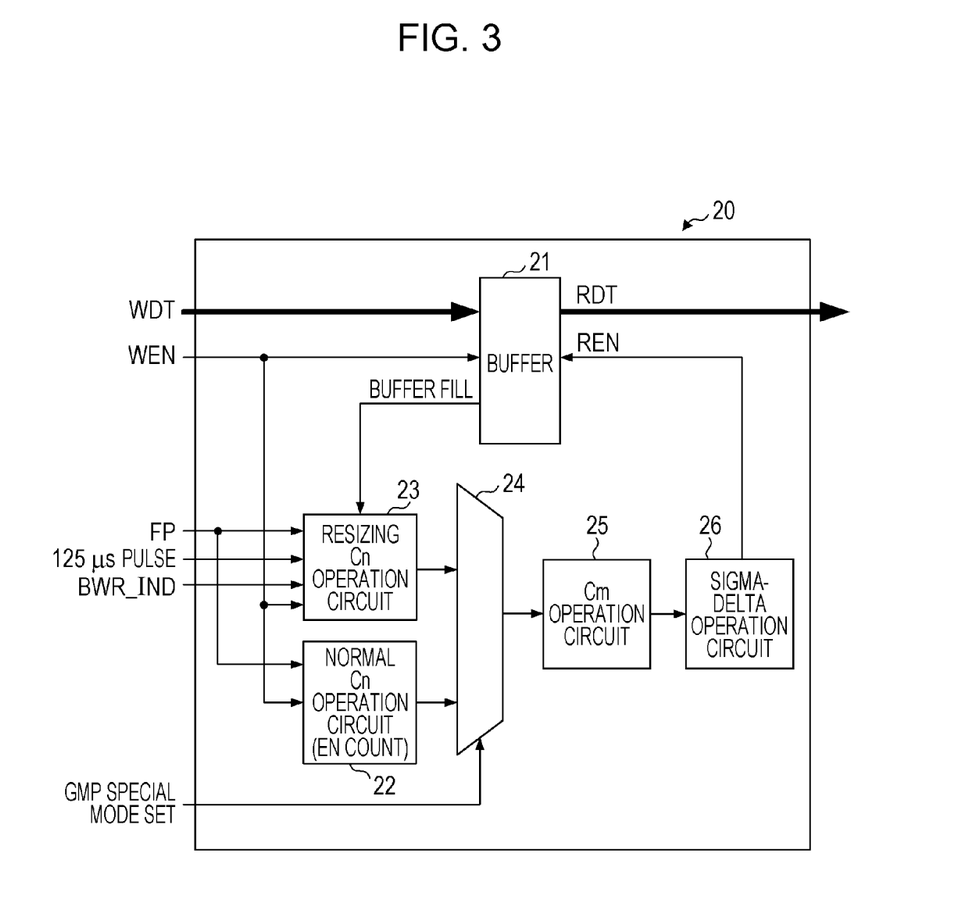
FIG. 3 is a configuration diagram of an example of a frame converter.
Figure 4:
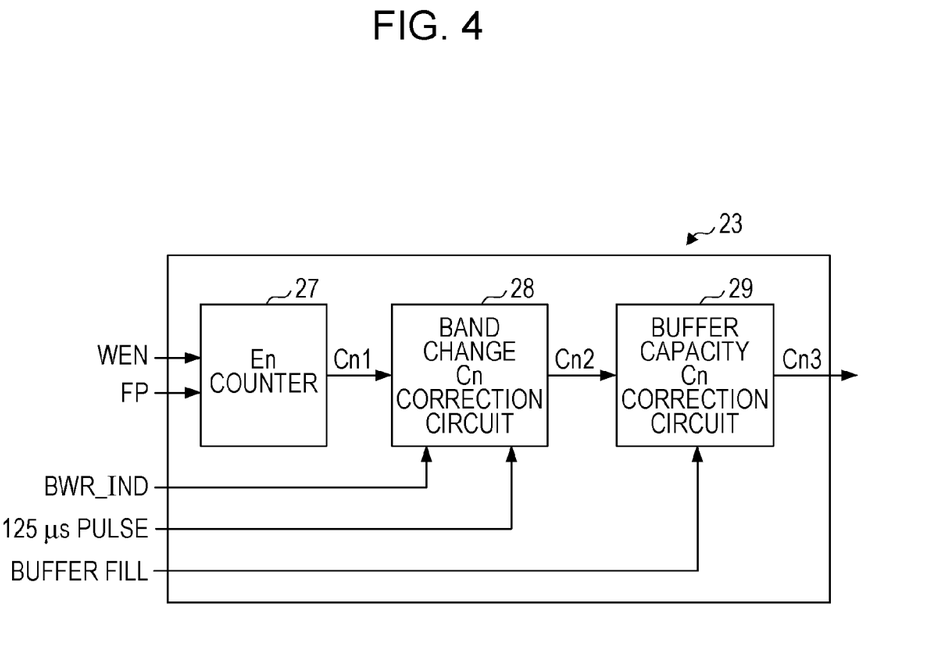
FIG. 4 is a configuration diagram of an example of a resizing Cn operation circuit.
Figure 5:
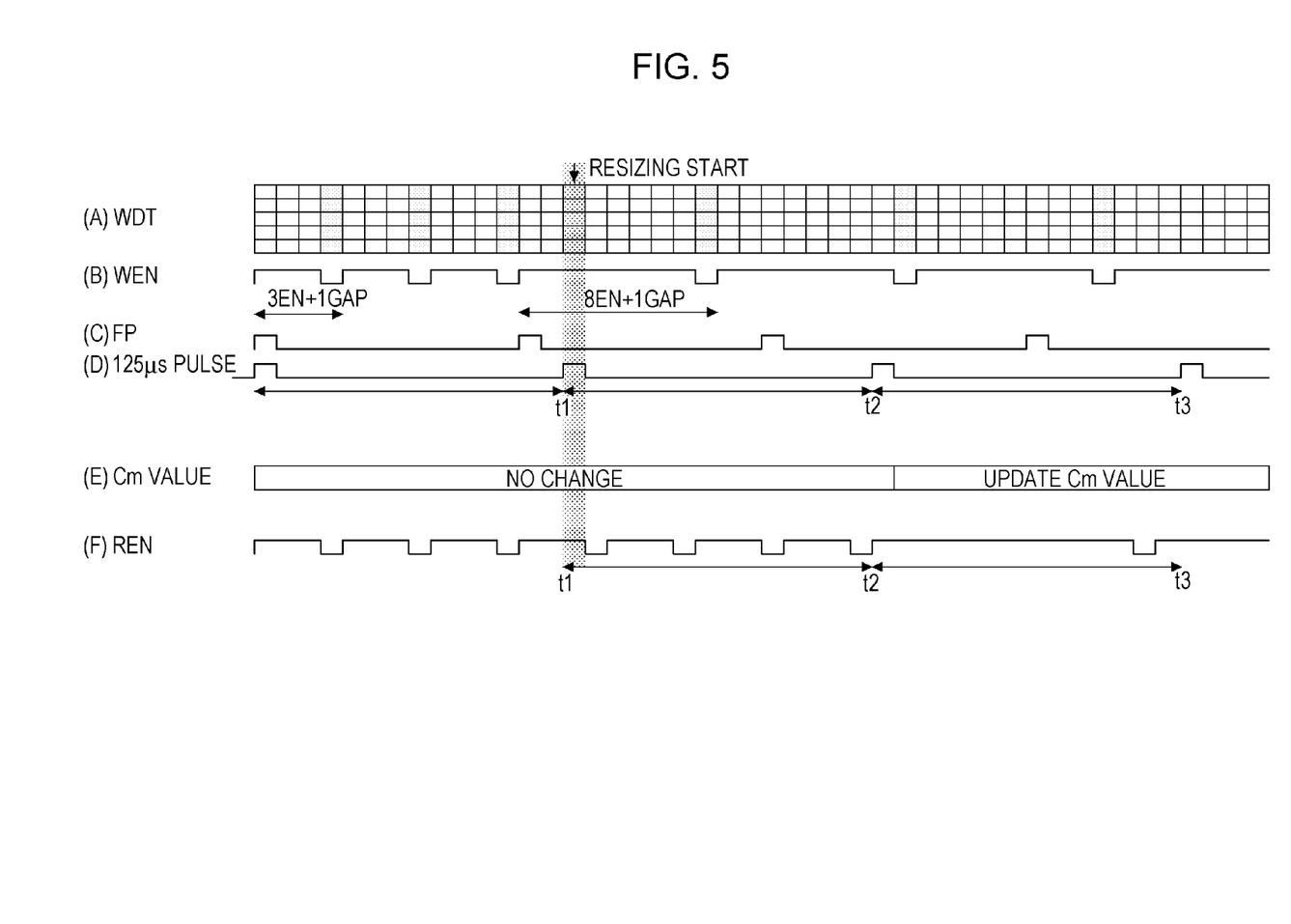
FIG. 5 is a signal timing chart of each component in FIG. 3.

FIG. 3 illustrates a configuration diagram of the frame converter. The frame converter 20 illustrated in FIG. 3 is provided in the ODU framers 12A to 12M, the intermediate frame processing units 13A to 13M and 15A to 15N, and the ODU processing units 16A to 16N, which perform frame conversion, in the ADM apparatus illustrated in FIG. 2. FIG. 4 illustrates a configuration diagram of an example of a resizing Cn operation circuit which is a part of the frame converter. FIG. 5 illustrates a signal timing chart of each component in the frame converter.

In FIG. 3, write data WDT of an input frame illustrated in FIG. 5 (A) and write enable WEN illustrated in FIG. 5 (B) are supplied to a buffer 21. The buffer 21 includes a First In First Out (FIFO) and an address counter. When the value of the write enable WEN is 1, the write data WDT is written to the buffer 21. When the value of read enable REN illustrated in FIG. 5 (F), which is supplied from a sigma-delta operation circuit 26, is 1, the buffer 21 reads read data RDT and outputs the read data RDT as an output frame.

Further, the buffer 21 generates a Buffer fill signal which increases an output data rate when an accumulation amount of the buffer 21 becomes greater than the central value (one-half of the maximum capacity of the buffer) by a predetermined value Dth and decreases the output data rate when the accumulation amount becomes smaller than the central value by the predetermined value Dth and supplies the Buffer fill signal to a resizing Cn operation circuit 23.

A normal Cn operation circuit 22 counts the write enable WEN illustrated in FIG. 5 (B) with a period of a frame pulse FP illustrated in FIG. 5 (C) and supplies the counted value to a selector 24 as a count value (Cn value).

As illustrated in FIG. 4, the resizing Cn operation circuit 23 includes an En counter 27, a band change Cn correction circuit 28, and a buffer capacity Cn correction circuit 29. The En counter 27 counts the write enable WEN with a period of the frame pulse FP and supplies the count value to the band change Cn correction circuit 28 as a Cn1 value.

When the band change Cn correction circuit 28 receives an instruction of BWR, if a 125 µs pulse in FIG. 5 (D), which indicates a timing of resizing start, is supplied, the band change Cn correction circuit 28 increases or decreases the Cn1 value by 1 to change a band of resizing and supplies the changed Cn1 value to the buffer capacity Cn correction circuit 29 as a Cn2 value. The buffer capacity Cn correction circuit 29 increases or decreases the Cn value in order to create a Cm value by using the actual amount accumulated in the buffer by correcting the Cn2 value according to the Buffer fill signal and outputs the changed Cn value as a Cn3 value. The Cn3 value outputted from the buffer capacity Cn correction circuit 29 is supplied to the selector 24.

The selector 24 selects the Cn value outputted from the normal Cn operation circuit 22 in normal times and selects the Cn3 value which is a Cn value outputted from the resizing Cn operation circuit 23 when resizing is performed. The selector 24 outputs the selected value to the Cm operation circuit 25.

The Cm operation circuit 25 counts a system clock (not indicated in drawings) of the transmission apparatus that includes the Cm operation circuit 25, and every time a predetermined period PS is reached, the Cm operation circuit 25 samples the Cn value supplied from the selector 24 and supplies the sampled value to the sigma-delta operation circuit 26 as the Cm value. A state of the Cm value is illustrated in FIG. 5 (E). The Cm value represents the number of effective data included in the output frame. The period PS represents a frame length of the output frame.

The sigma-delta operation circuit 26 is supplied the Cm value through the Cm operation circuit 25 from the selector 24 and also supplied a system clock to generate an output frame. Further, the period PS is set in the sigma-delta operation circuit 26 in advance. The sigma-delta operation circuit 26 generates a sub-sampling signal at a sub-sampling rate (Cm/PS), which is a ratio between the Cm value and the period PS. It is possible to obtain a converted clock which is a clock of the converted frame by sub-sampling the system clock by using the sub-sampling signal, that is, by masking the system clock by using the sub-sampling signal. The sigma-delta operation circuit 26 generates the read enable REN illustrated in FIG. 5 (F) by using the converted clock and supplies the read enable REN to the buffer 21.

In FIG. 5, the resizing in which the input data rate increases is started at time t1 when the 125 μs pulse is inputted, and when the next 125 μs pulse is inputted at time t2, the Cm value is updated on the basis of the increase of the input data rate at the time t1. Therefore, in a period of time from the time t1 to the time t2, the input data rate is greater than the output data rate, and in the next period of time from the time t2 to the time t3, the input data rate is smaller than the output data rate. The difference between the input data rate and the output data rate is a cause of variation of the buffer accumulation amount.

Figure 6:
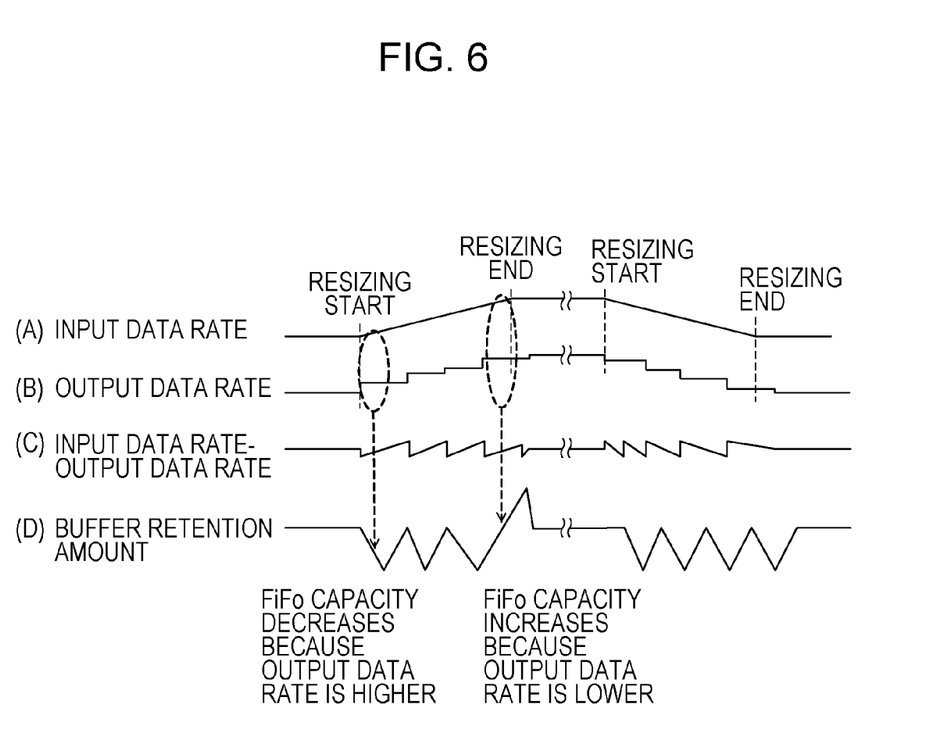
FIG. 6 is a configuration diagram illustrating a relationship between an input data rate, an output data rate, and a buffer accumulation amount.

FIG. 6 illustrates a relationship between the input data rate, the output data rate, and the buffer accumulation amount in the frame converter in FIG. 3, which performs the resizing by the BWR. Here, the accumulation amount of the buffer 21 is monitored. When the accumulation amount of the buffer 21 becomes greater than the central value by the predetermined value Dth, the output data rate is increased, and when the accumulation amount becomes smaller than the central value by the predetermined value Dth, the output data rate is decreased, so that the output data rate is corrected.

The increase and decrease of the output data rate illustrated in FIG. 6 (B) with respect to the increase and decrease of the input data rate during the resizing illustrated in FIG. 6 (A) have a staircase shape, so that variation occurs between the input data rate and the output data rate illustrated in FIG. 6 (C). The accumulation amount of the buffer 21 varies largely as illustrated in FIG. 6 (D) due to the variation between the input data rate and the output data rate. Therefore, the frame converter is desired to be provided with a buffer with a large accumulation amount. Further retention time of data in the buffer increases when the buffer accumulation amount increases, so that transmission delay of data increases.

Figure 7:
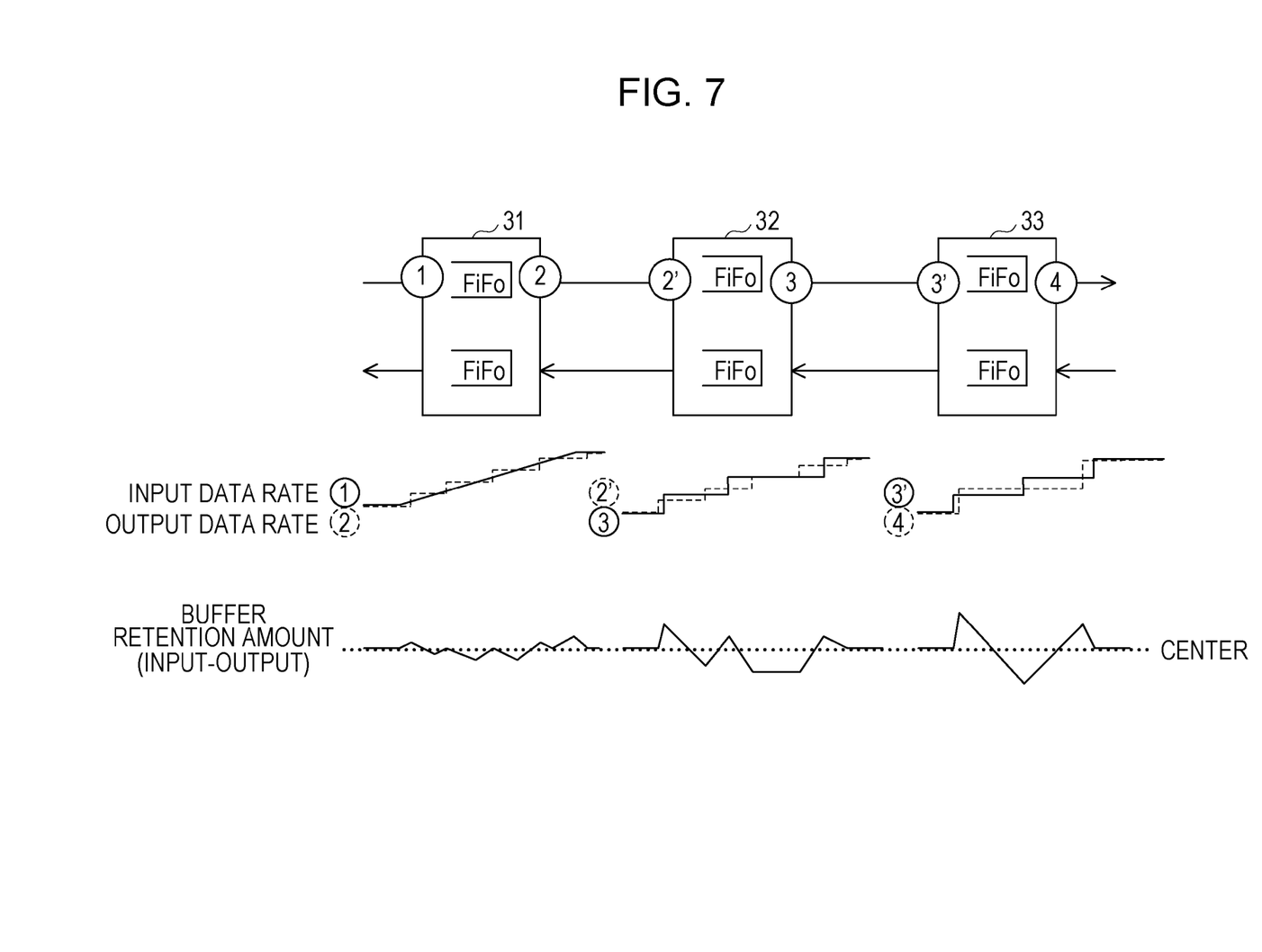
FIG. 7 is a diagram for explaining a case in which transmission apparatuses are multistage-connected.

When transmission apparatuses 31, 32, and 33 including the frame converter are multistage-connected as illustrated in FIG. 7, in the second and the third transmission apparatuses 32 and 33, the granularity, that is, the variation of the increase and decrease of the input data rate increases, so that the buffer accumulation amount increases and decreases sharply. In FIG. 7, the input data rate is indicated by a solid line and the output data rate is indicated by a dashed line below each transmission apparatus 31, 32, and 33.

In this way, the variation of the increase and decrease of the data rate increases every time passing the transmission apparatus, so that the buffer accumulation amount for absorbing the variation of the data rate is greater in the transmission apparatus 32 than in the transmission apparatus 31, and is much greater in the transmission apparatus 33 than in the transmission apparatus 32. In this case, the transmission apparatuses 31 to 33 have the same configuration, so that the transmission apparatuses 31 to 33 are desired to be provided with the buffer accumulation amount used by the third transmission apparatus 33.

Embodiment of Frame Converter

Figure 8:
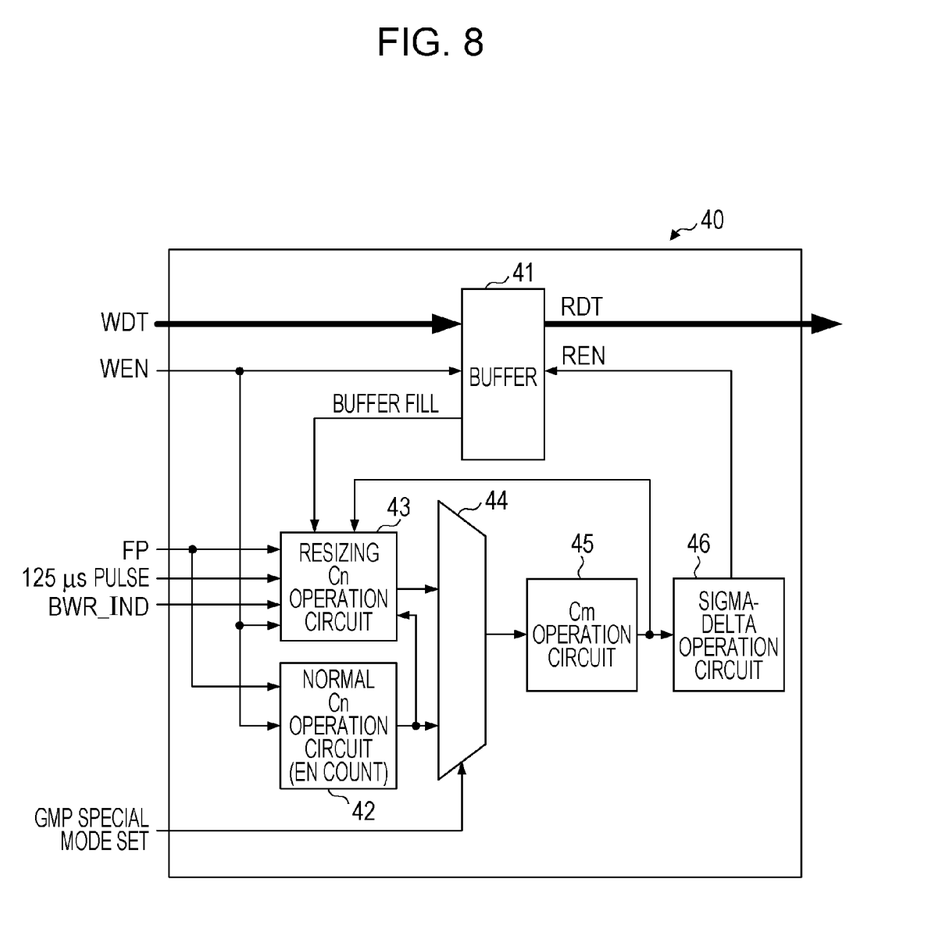
FIG. 8 is a configuration diagram of an embodiment of a frame converter.
Figure 9:
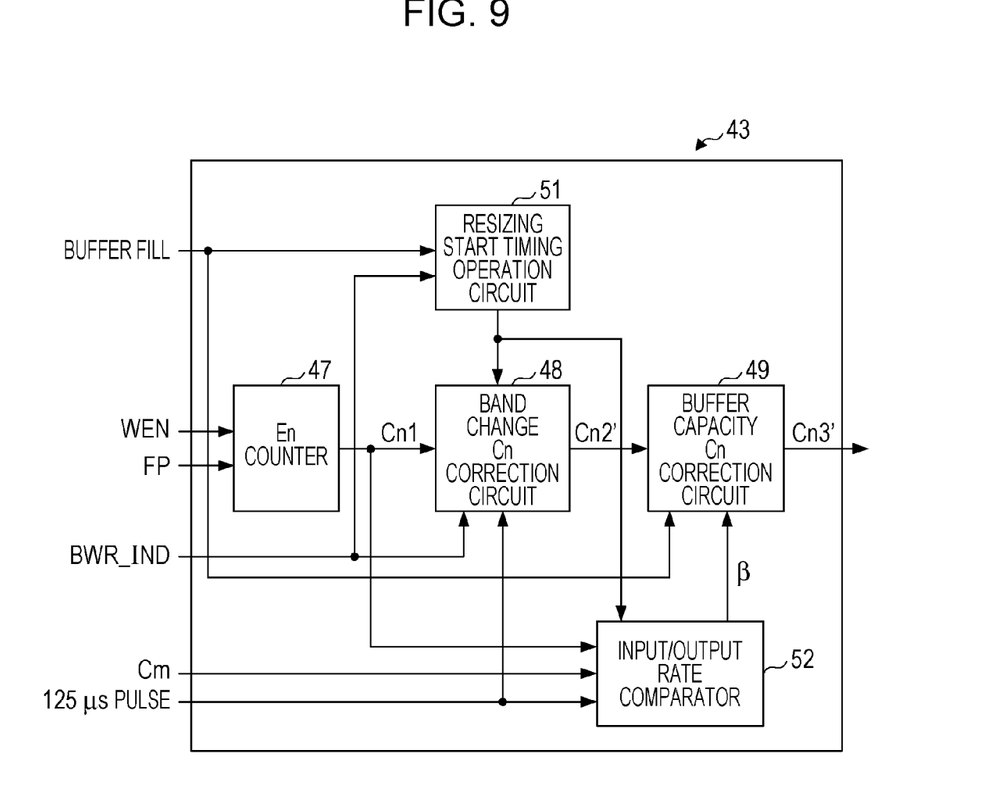
FIG. 9 is a configuration diagram of an embodiment of a resizing Cn operation circuit.
Figure 10:
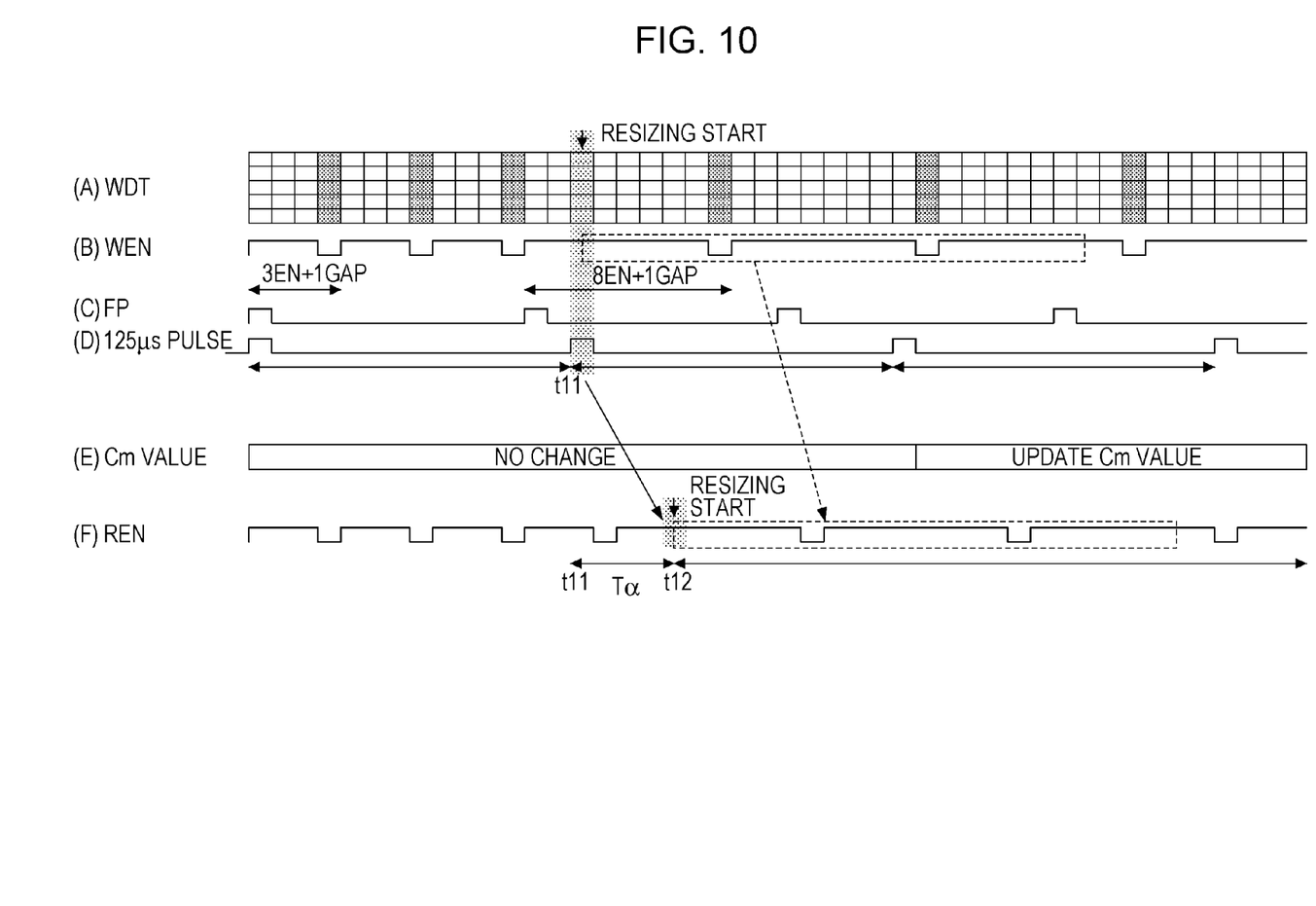
FIG. 10 is a timing chart of each component in FIG. 8.

FIG. 8 illustrates a configuration diagram of an embodiment of the frame converter. The frame converter 40 illustrated in FIG. 8 is provided in the ODU framers 12A to 12M, the intermediate frame processing units 13A to 13M and 15A to 15N, and the ODU processing units 16A to 16N, which perform frame conversion, in the ADM apparatus illustrated in FIG. 2. FIG. 9 illustrates a configuration diagram of an embodiment of a resizing Cn operation circuit which is a part of the frame converter. FIG. 10 illustrates a signal timing chart of each component in the frame converter.

In FIG. 8, write data WDT of an input frame illustrated in FIG. 10 (A) and write enable WEN illustrated in FIG. 10 (B) are supplied to a buffer 41. The buffer 41 includes a FIFO and an address counter. When the value of the write enable WEN is 1, the write data WDT is written to the buffer 41. When the value of read enable REN illustrated in FIG. 10 (F), which is supplied from a sigma-delta operation circuit 46, is 1 for example, the buffer 41 reads read data RDT of an output frame and outputs the read data RDT.

Further, the buffer 41 generates a Buffer fill signal to increase an output data rate when an accumulation amount of the buffer becomes greater than the central value (one-half of the maximum capacity of the buffer) by a predetermined value Dth and decrease the output data rate when the accumulation amount becomes smaller than the central value by the predetermined value Dth and supplies the Buffer fill signal to a resizing Cn operation circuit 43.

A normal Cn operation circuit 42 counts the write enable WEN illustrated in FIG. 10 (B) with a period of a frame pulse FP illustrated in FIG. 10 (C) and supplies the counted value to a selector 44 as a Cn value. The resizing Cn operation circuit 43 will be described later.

The selector 44 selects the Cn value outputted from the normal Cn operation circuit 42 in normal times and selects the Cn3 value which is a Cn value outputted from the resizing Cn operation circuit 43 when resizing (GMP special mode) is performed. The selector 44 outputs the selected value to the Cm operation circuit 45.

The Cm operation circuit 45 counts a system clock of the transmission apparatus that includes the Cm operation circuit 45, and every time a predetermined period PS is reached, the Cm operation circuit 45 samples the Cn value supplied from the selector 44 and supplies the sampled value to the sigma-delta operation circuit 46 and the resizing Cn operation circuit 43 as the Cm value. A state of the Cm value is illustrated in FIG. 10 (E). The Cm value represents the number of effective data included in the output frame. The period PS represents a frame length of the output frame.

The sigma-delta operation circuit 46 is supplied the Cm value from the selector 44 and also supplied a system clock to generate an output frame. Further, the period PS is set in the sigma-delta operation circuit 26 in advance. The sigma-delta operation circuit 46 generates a sub-sampling signal at a sub-sampling rate (Cm/PS), which is a ratio between the Cm value and the period PS. It is possible to obtain a converted clock which is a clock of the converted frame by sub-sampling the system clock by using the sub-sampling signal, that is, by masking the system clock by using the sub-sampling signal. The sigma-delta operation circuit 46 generates the read enable REN illustrated in FIG. 10 (F) by using the converted clock and supplies the read enable REN to the buffer 41.

The resizing Cn operation circuit 43 illustrated in FIG. 9 includes an En counter 47, a band change Cn correction circuit 48, a buffer capacity Cn correction circuit 49, a resizing start timing operation circuit 51, and an input/output rate comparator 52.

In FIG. 9, when the resizing start timing operation circuit 51 receives an instruction of BWR (BWR_IND=1), the resizing start timing operation circuit 51 calculates a time interval $T\alpha$ from a pulse with a period of 125 µs in FIG. 10 (B) which indicates the resizing start timing of the input data rate to the resizing start timing of the output data rate, and notifies the band change Cn correction circuit 48 and the input/output rate comparator 52 of the time interval $T\alpha$. The resizing start timing operation circuit 51 functions as an example of a setting unit.

The time interval $T\alpha$ is substantially the same as a data latency in the buffer 41 in normal times without performing resizing, that is, a period of time in which data is delayed (or retained) in the buffer 41. The value of the time interval $T\alpha$ varies according to an operating condition of the buffer 41. Specifically, the time interval $T\alpha$ is calculated so that a period of time from when the inputted data is stored in the buffer 41 to when the data is outputted from the buffer 41 is the same before and during the resizing. Although the resizing start timing is a pulse with a period of 125 µs in the present embodiment, the pulse is not limited to the pulse with a period of 125 µs, and a pulse with any period may be used.

The En counter 47 counts the write enable WEN with a period of the frame pulse FP and supplies the counted value to the band change Cn correction circuit 48 as a Cn1 value.

When the band change Cn correction circuit 48 receives an instruction of BWR (BWR_IND=1), if a 125 µs pulse in FIG. 10 (D) is supplied, when a resizing start timing of the output data rate is notified from the resizing start timing operation circuit 51, the band change Cn correction circuit 48 increases or decreases the Cn1 value by 1 to change a band of resizing and supplies the changed Cn1 value to the buffer capacity Cn correction circuit 49 as a Cn2' value.

The input/output rate comparator 52 is supplied the Cn1 value from the En counter 47, the Cm value from the Cm operation circuit 45, the 125 µs pulse that indicates the resizing start timing, and the resizing start timing of the output data rate from the resizing start timing operation circuit 51. The input/output rate comparator 52 compares the Cn1 value that represents the input data rate and the Cm value that represents the output data rate and performs the following processes.

When the Cn1 value that represents the input data rate is greater than the Cm value, which represents the output data rate, $+\alpha$, the input/output rate comparator 52 obtains a correction value $\beta$ that increases the Cm value that represents the output data rate.

When the Cn1 value that represents the input data rate is equal to the Cm value, which represents the output data rate, $+\alpha$, the input/output rate comparator 52 does not correct the Cm value that represents the output data rate. In other words, the correction value $\beta$ is equal to 0.

When the Cn1 value that represents the input data rate is smaller than the Cm value, which represents the output data rate, $+\alpha$, the input/output rate comparator 52 obtains a correction value $\beta$ that decreases the Cm value that represents the output data rate.

Here, a is a value obtained by multiplying the Cn1 value that represents the input data rate by (delay time $T\alpha$ of the resizing start timing/125 µs). The correction value $\beta$, which is a data rate correction value, is obtained by operating the Cn1 value that represents the input data rate, the Cm value that represents the output data rate, and the time interval $T\alpha$. The correction value $\beta$ is a value to maintain the data latency, that is, the period of time in which data is delayed (or retained) in the buffer 41, at the same level by approximating the Cm value that represents the output data rate to the Cn1 value that represents the input data rate. The correction value $\beta$ generated by the input/output rate comparator 52 is supplied to the buffer capacity Cn correction circuit 49.

The buffer capacity Cn correction circuit 49 performs correction to vary the Cn2' value according to the Buffer fill signal, so that the buffer capacity Cn correction circuit 49 increases or decreases the Cn value in order to create a Cm value by using the actual amount accumulated in the buffer and adds the correction value $\beta$ from the input/output rate comparator 52 to the Cn value, and then, outputs the changed Cn value as a Cn3' value. The Cn3' value outputted from the buffer capacity Cn correction circuit 49 is supplied to the selector 44. The En counter 47, the band change Cn correction circuit 48, the buffer capacity Cn correction circuit 49, and the input/output rate comparator 52 function as an example of an adjustment unit. The En counter 47 is an example of a counter unit. The band change Cn correction circuit 48 is an example of a first correction circuit. The buffer capacity Cn correction circuit 49 is an example of a second correction circuit. The input/output rate comparator 52 is an example of a comparator.

The selector 44 illustrated in FIG. 8 selects the Cn value from the normal Cn operation circuit 42 in normal times and selects the Cn3' value which is a Cn value from the resizing Cn operation circuit 43 when resizing is performed. The selector 44 outputs the selected value to the Cm operation circuit 45.

The Cm operation circuit 45 counts a system clock of the transmission apparatus that includes the Cm operation circuit 45, and every time a predetermined period PS is reached, the Cm operation circuit 45 samples the Cn value supplied from the selector 44 and supplies the sampled value to the sigma-delta operation circuit 46 as the Cm value. A state of the Cm value is illustrated in FIG. 10 (E).

The sigma-delta operation circuit 46 generates a sub-sampling signal at a sub-sampling rate, which is a ratio between the Cm value and the period PS. It is possible to obtain a converted clock which is a clock of the converted frame by sub-sampling the system clock by using the sub-sampling signal, that is, by masking the system clock by using the sub-sampling signal. The sigma-delta operation circuit 46 generates the read enable REN illustrated in FIG. 10 (F) by using the converted clock and supplies the read enable REN to the buffer 41.

In FIG. 10, the resizing in which the input data rate increases is started at time t11 when the 125 µs pulse is inputted, and the resizing in which the output data rate increases is started at time t12 when the time interval $T\alpha$ has elapsed since the time t11. After the time interval Tα has elapsed since the time t12, the output data rate increases so that the output data rate corresponds to the input data rate.

Figure 11:
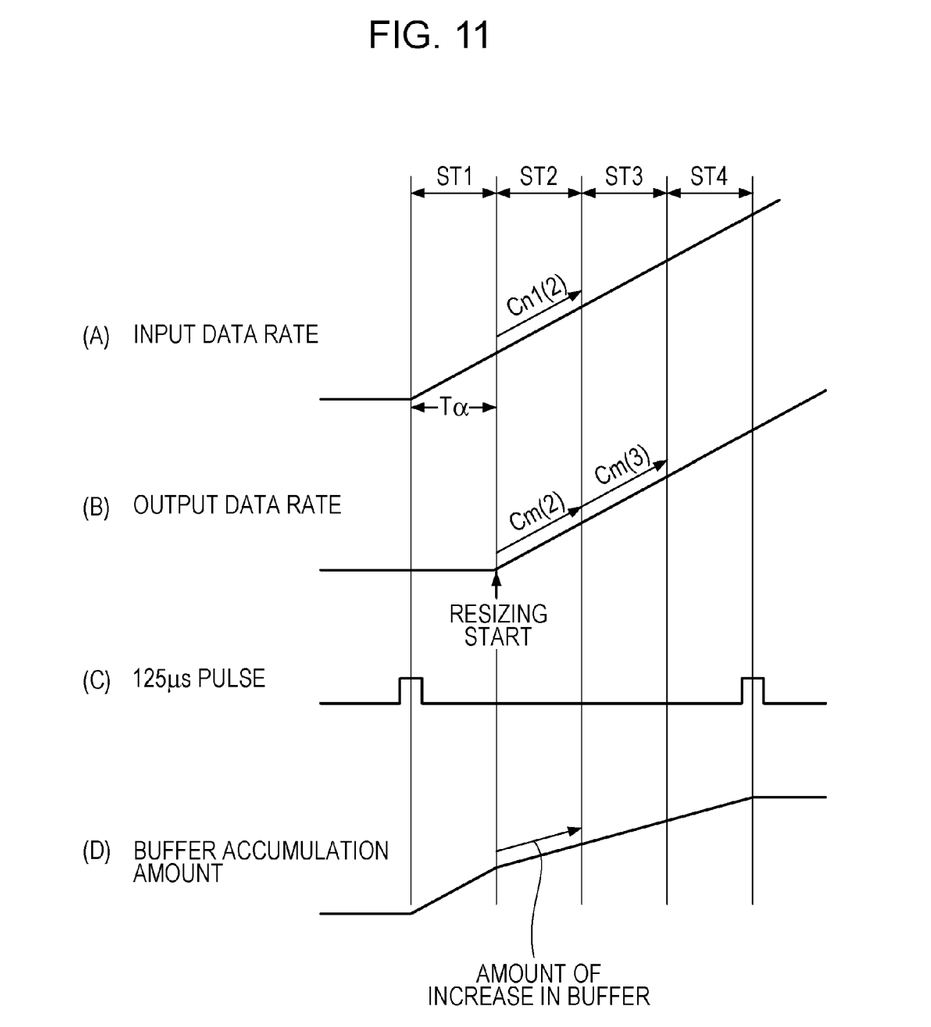
FIG. 11 is a signal timing chart for explaining an operation.

Operations of the resizing start timing operation circuit 51 and the input/output rate comparator 52 will be described with reference to a timing chart in FIG. 11. The resizing of the input data rate is started in synchronization with the 125 µs pulse illustrated in FIG. 11 (C), so that the input data rate illustrated in FIG. 11 (A) increases. The time interval Tα is operated by the resizing start timing operation circuit 51. The resizing of the output data rate is started after the time interval Tα from the resizing start timing of the input data rate and the output data rate illustrated in FIG. 11 (B) increases.

In a stage ST2 of the time interval Tα from the resizing start timing of the output data rate, the time interval Tα, the Cn1(2) value according to the input data rate, and the Cm(2) value according to the output data rate are supplied to the input/output rate comparator 52, and the input/output rate comparator 52 obtains the correction value β to acquire a Cm(3) value in the next stage ST3 on the basis of the time interval Tα, the Cn1(2) value, and the Cm(2) value. Specifically, the input/output rate comparator 52 obtains the correction value β by determining whether the data latency in the buffer 41 tends to increase or tends to decrease from the rates of increase of the Cn1(2) value and the Cm(2) value in the time interval Tα. In this way, the data accumulation amount in the buffer 41 illustrated in FIG. 11 (D) increases.

Figure 12:
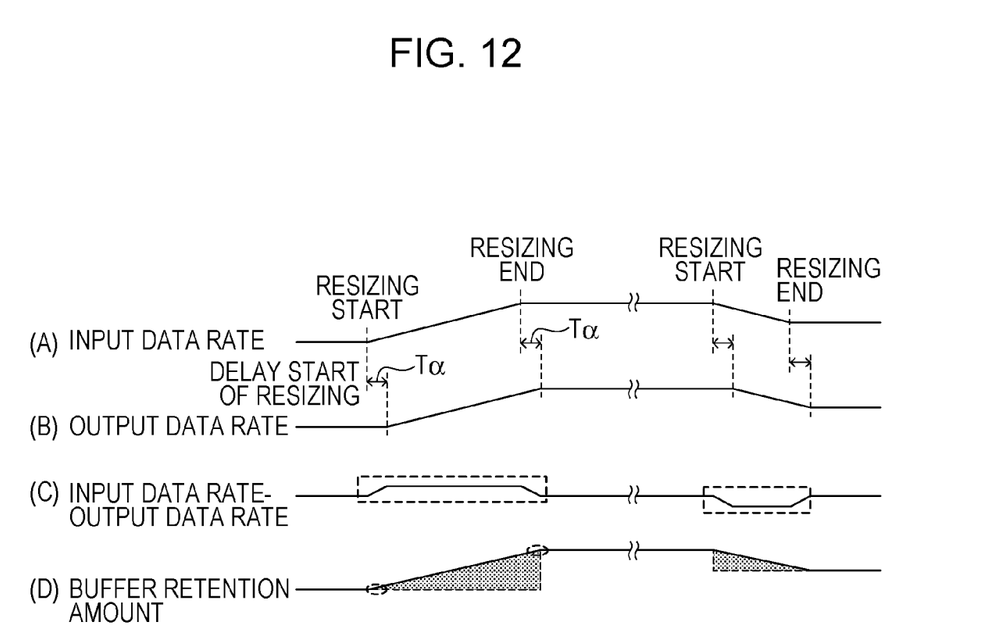
FIG. 12 is a configuration diagram illustrating a relationship between an input data rate, an output data rate, and a buffer accumulation amount.

FIG. 12 illustrates a relationship between the input data rate, the output data rate, and the buffer accumulation amount in the frame converter in FIG. 8, which performs the resizing by the BWR.

As illustrated in FIG. 12 (B), the increase and decrease of the output data rate is started with a delay of the time interval Tα from the increase and decrease of the input data rate during the resizing illustrated in FIG. 12 (A) and the output data rate is controlled so that the output data rate corresponds to the input data rate. Thereby, as illustrated in FIG. 12 (C), the difference between the input data rate and the output data rate remains substantially unchanged except for the time interval Tα at the start of the resizing and the end of the resizing. The difference between the input data rate and the output data rate is accumulated, so that the buffer accumulation amount increases or decreases monotonically as illustrated in FIG. 12 (D). Although the buffer accumulation amount increases or decreases monotonically in this way, the buffer accumulation amount does not vary largely as illustrated in FIG. 6 (D). Therefore, the buffer accumulation amount illustrated in FIG. 12 (D) is smaller than the buffer accumulation amount illustrated in FIG. 6 (D). The retention time of data in the buffer decreases when the buffer accumulation amount decreases, so that the transmission delay of data decreases.

Here, when the data latency is Lt, the buffer accumulation amount is Bt, the input data rate is Ri, and the output data rate is Ro, there is the relationship represented by the formula below.

$$Lt=Bt/Ro$$

When the data latency is substantially unchanged, the following formula is established.

$$Ri-Ro = \text{substantially unchanged}$$

Figure 13:
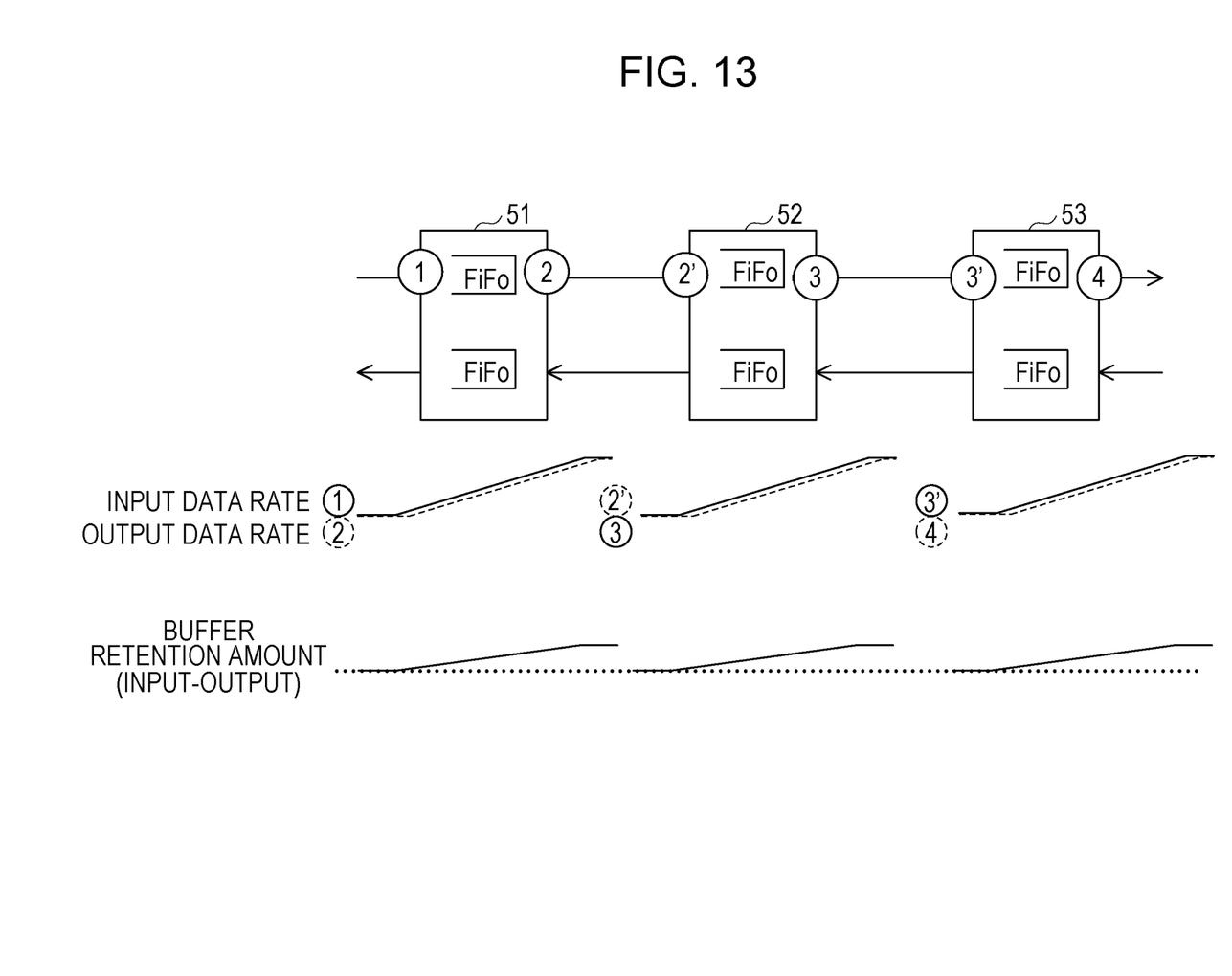
FIG. 13 is a diagram for explaining a case in which transmission apparatuses are multistage-connected.

Even when transmission apparatuses 51, 52, and 53 including the frame converter are multistage-connected as illustrated in FIG. 13, the variation of the input data rate is small in each transmission apparatus, so that the buffer accumulation amount increases or decreases monotonously. Therefore, the buffer accumulation amount is substantially the same in the first transmission apparatus 51, the second transmission apparatus 52, and the third transmission apparatus 53, and the buffer accumulation amount does not increase in the latter transmission apparatus from that in the former transmission apparatus. In FIG. 13, the input data rate is indicated by a solid line and the output data rate is indicated by a dashed line below each transmission apparatus 51, 52, and 53.

In this way, the resizing start timing of the output data rate is delayed from the resizing start timing of the input data rate by the time interval Tα, and thereafter, the increase (or the decrease) of the output data rate is controlled to correspond to the increase (or the decrease) of the input data rate for every time interval Tα. By controlling in this manner, the buffer accumulation amount does not increase or decrease, and the data latency in the buffer, that is, the period of time in which data is delayed (or retained) in the buffer 41, remains unchanged. Thereby, it is possible to suppress the variation of increase and decrease of the output data rate with respect to the increase and decrease of the input data rate.

Application Example

The applicant proposed "Transmission apparatus, transmission method and method of altering transmission band" in Japanese Patent Application No. 2012-061197, filed on Mar. 16, 2012 (U.S. application Ser. No. 13/787,856). The proposed transmission apparatus transmits frames accommodating client data over a transmission network. The transmission apparatus includes a clock generation unit that generates a clock for timing processing period of signal processing, a deviation detection unit that detects a clock deviation between the clock generated by the clock generation unit and the clock used for timing processing period of signal processing by other transmission apparatus that receives the client data from outside the transmission network and adds them to a frame, and a timing generation unit that generates timing signal of processing period of signal processing corrected with the clock deviation, so that the transmission apparatus alleviates restriction in increasing speed of transmission processing of client data due to the clock deviation between the transmission apparatuses.

The frame converter of the present embodiment illustrated in FIG. 8 is applied to the transmission apparatus proposed in Japanese Patent Application No. 2012-061197 described above, so that the resizing start timing of the output data rate is delayed from the resizing start timing of the input data rate by the time interval Tα and correction is performed so that the data latency is not changeable, that is, the output data rate corresponds to the input data rate. Thereby, when implementing high-speed resizing, it is possible to reduce the capacity of the buffer where the resizing is performed and reduce the transmission delay.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A frame converter that writes input data included in an input frame to a buffer to accumulate the input data and outputs data read from the buffer as output data included in an output frame, the frame converter comprising:
 a setting unit configured to set a time interval from start of resizing of data rate of the input data to start of resizing of data rate of the output data when resizing of an accumulation amount in the buffer is performed in which data rates of the input data and the output data vary; and
 an adjustment unit configured to, after the time interval has elapsed, adjust the data rate of the output data to correspond to the data rate of the input data during the time interval.

2. The frame converter according to claim 1, wherein the adjustment unit includes:
 a counter unit configured to count the number of data written to the buffer for each input frame and obtain a value that represents the data rate of the input data;
 a first correction circuit configured to vary the value that represents the data rate of the input data according to an instruction of resizing of the accumulation amount in the buffer;
 a comparator configured to obtain a data rate correction value to adjust the data rate of the output data to correspond to the data rate of the input data according to a comparison result between the value that represents the data rate of the input data and a value that represents the data rate of the output data; and
 a second correction circuit configured to correct the value corrected by the first correction circuit according to the accumulation amount in the buffer by using the data rate correction value obtained by the comparator.

3. The frame converter according to claim 2, wherein the first correction circuit increases or decreases the value that represents the data rate of the input data every predetermined period of time according to the instruction of resizing of the accumulation amount in the buffer.

4. The frame converter according to claim 3, wherein the second correction circuit corrects the value corrected by the first correction circuit when the accumulation amount in the buffer increases or decreases from one-half of a maximum accumulation amount of the buffer by a predetermined value or more.

5. A frame conversion method of writing input data included in an input frame to a buffer to accumulate the input data and outputting data read from the buffer as output data included in an output frame, the frame conversion method comprising:
 setting a time interval from start of resizing of data rate of the input data to start of resizing of data rate of the output data when resizing of an accumulation amount in the buffer is performed in which data rates of the input data and the output data vary; and
 adjusting, after the time interval has elapsed, the data rate of the output data to correspond to the data rate of the input data during the time interval.

6. The frame conversion method according to claim 5, wherein the adjusting the data rate of the output data includes:
 counting the number of data written to the buffer for each input frame;
 obtaining a value that represents the data rate of the input data;
 increasing or decreasing the value that represents the data rate of the input data according to an instruction of resizing of the accumulation amount in the buffer;
 obtaining a data rate correction value to adjust the data rate of the output data to correspond to the data rate of the input data according to a comparison result between the value that represents the data rate of the input data and a value that represents the data rate of the output data; and
 correcting the value, which represents the data rate of the input data and which is increased or decreased according to the instruction of resizing, according to a data accumulation amount in the buffer by using the data rate correction value.

7. The frame conversion method according to claim 6, wherein the value that represents the data rate of the input data is increased or decreased every predetermined period of time according to the instruction of resizing of the accumulation amount in the buffer.

8. The frame conversion method according to claim 7, wherein the value, which represents the data rate of the input data and which is increased or decreased according to the instruction of resizing of the accumulation amount in the buffer, is corrected when the data accumulation amount in the buffer increases or decreases from one-half of a maximum accumulation amount of the buffer by a predetermined value or more.

9. A transmission apparatus having a frame converter that writes input data included in an input frame to a buffer to accumulate the input data and outputs data read from the buffer as output data included in an output frame, the transmission apparatus comprising:
 a setting unit configured to set a time interval from start of resizing of data rate of the input data to start of resizing of data rate of the output data when resizing of an accumulation amount in the buffer is performed in which data rates of the input data and the output data vary; and
 an adjustment unit configured to, after the time interval has elapsed, adjust the data rate of the output data to correspond to the data rate of the input data during the time interval.

* * * * *